Jan. 22, 1957 W. T. HARRIS 2,778,998
LOW-FREQUENCY RESPONSIVE MEANS
Filed May 3, 1952
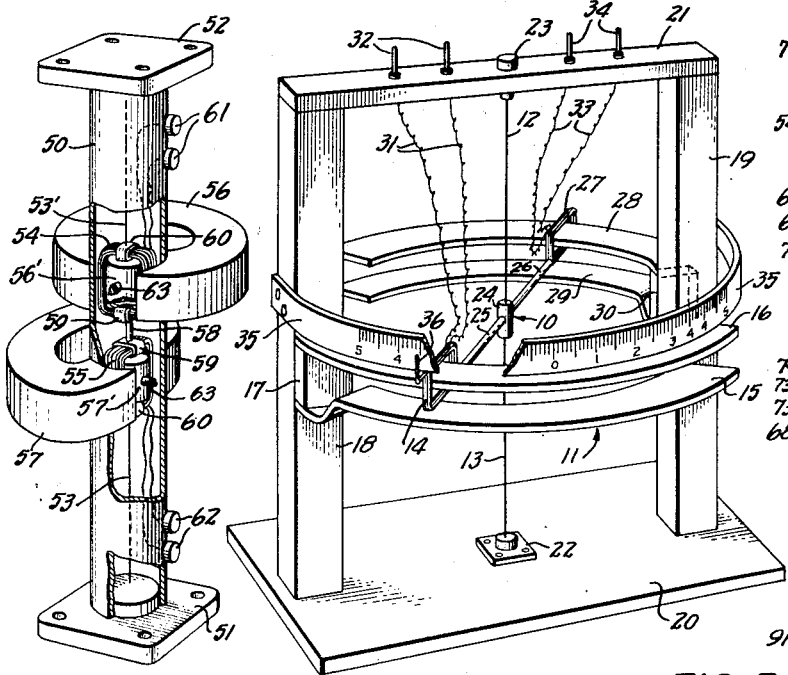
INVENTOR.
WILBUR T. HARRIS
BY
*Mitchell & Bechert*
ATTORNEYS

United States Patent Office 2,778,998
Patented Jan. 22, 1957

2,778,998

LOW-FREQUENCY RESPONSIVE MEANS

Wilbur T. Harris, Southbury, Conn., assignor to The Harris Transducer Corporation, Woodbury, Conn., a corporation of Connecticut Application May 3, 1952, Serial No. 285,991

4 Claims. (Cl. 324—143)

My invention relates to low-frequency electrically-responsive devices, in which mechanical properties of moving parts largely determine the electrical response.

It is an object of the invention to provide an improved device of the character indicated.

A specific object is to provide an improved frequency indicator and analyzer operative at relatively low frequencies.

Another specific object is to provide an improved low-frequency circuit-element transducer.

It is a general object to meet the above objects with constructions featuring simplicity of components and, where possible, compactness of over-all assembly.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Figs. 1 and 2 are perspective views illustrating alternative applications of the invention to frequency indicators or analyzers which may have further utility as circuit-element transducers; and Figs. 3, 4, and 5 are perspective views, partly broken away and illustrating applications of the invention to three alternative devices having particular utility as circuit-element transducers.

Briefly stated, my invention contemplates a low-frequency electrically-responsive device, in which mechanical dimensions of relatively rotating parts largely determine the electrical response, and in which torsionally resilient means support the relatively rotatable elements for torsionally resilient relative rotation. One of the relatively rotatable elements may include magnetic means with an arcuate annular gap, and the other element may include an electrically conducting loop cutting magnetic lines of the gap.

Two general forms of the invention are shown and described. In the first of these, the device produces a visual display of the nature of the low-frequency response to particular electrical input, as for use in measuring and analyzing applications; use as a circuit-element transducer may be incidental to this general form. In the other general form, the device is useful primarily as a circuit-element transducer, having an input circuit and an output circuit coupled solely by mechanical means which dominate the functioning of the device. In some forms, the magnet is held stationary, while the coil or coils are mounted for torsionally suspended rotation; alternatively, the coils may be held stationary, while the magnet means, or at least part thereof, is torsionally suspended for rotation.

Referring to Fig. 1 of the drawings, my invention is shown in application to a low-frequency device adaptable to frequency analysis of electrical signals, as for the indication of excitation amplitudes at particular frequencies.

Basically, the device comprises rotatable means 10 and fixed means 11 and a torsionally flexible suspension 12—13 between the two. In the form shown, the fixed means includes magnetic elements defining a gap extending generally radially of the axis of torsional rotation, and the rotatable means includes a loop 14 of electrically conducting material with at least one leg cutting magnetic lines in the gap. The gap is shown as defined between two axially-spaced plates 15—16 of magnetic material, arcuate about the torsional-suspension axis and joined at one end by magnetic means, such as a permanent bar magnet 17. The plates 15—16 are preferably of soft iron and may be spaced by an axial spread varying uniformly with angle from point of support at 17. However, I find that, with the plates 15—16 uniformly spaced throughout their angular extent, the progressive flux leakage between plates 15—16, as a function of angle from the point of connection to magnet 17, is sufficient for present purposes.

The plates 15—16 are shown supported at one end only, as by attachment to an upright or standard 18 forming part of the frame of the device. These plates 15—16 may extend for substantially a full revolution but are preferably spaced from a frame member 19 (for clearance) so as to facilitate assembly of the coil 14 as shown. If desired, the free ends of the poles 15—16 may be more ruggedly supported by removable non-magnetic means fastened to the frame member 19. Thus, in the form shown, the plates 15—16 extend just short of a half circle, so as to clear the second frame standard or support 19. Standards 18—19 may be mounted upon a base 20 and held in spaced relation at the top ends thereof by a cross-piece 21. Anchoring members 22—23 on the base 20 and cross-piece 21 serve to hold the torsional-suspension means 12—13 in proper alignment and under proper tension.

The rotating element 10 is shown to include a central boss or hub 24 secured to the torsional-suspension means 12—13 and supporting opposed arms 25—26. The coil 14 is carried at the end of the arm 25, and I prefer that the corresponding end of the arm 26 be counterweighed with a mass and radial spacing equivalent to that of the coil 14. In the form shown, the counterweight is realized by a second coil 27 attached to the arm 26 and coupled to one of the pole pieces 28 of a second magnet establishing an air gap between pole pieces 28—29. The second magnet 28—29 may be an exact duplicate of that described at 15—16—17 and may be mounted diametrically opposite thereto, as by securing the bar magnet 30 thereof to the standard 19. Electrical leads 31 to the coil 14 may be brought to terminals 32 on the cross-piece 21, and electrical leads 33 to the coil 27 may be brought to further terminals 34 on the cross-piece 21. As a means of indicating amplitude of oscillation about the axis of torsional rotation, I have provided a semi-cylindrical scale member 35 secured to the standards 18—19 and extending arcuately at a radius just inside the radius of a pointer 36 carried by the moving coil 14.

In operation, it will be seen that the natural-resonance frequency of the moving parts will be determined substantially only by mechanical dimensions and other properties, such as the effective mass of the coils 14—27, the effective radius at which the coil masses are located, the respective lengths of the torsional-suspension members 12—13 (which are preferably the same), the radius of the torsional-suspension members 12—13, and the torsional stiffness of the material of members 12—13. In a typical construction in which the resonant frequency is approximately ten cycles per second, each of the coils may have a mass of 10 grams, positioned effectively at two centimeters off the axis of rotation, and the effective length of torsional suspension 12—13 may be four centimeters, all for the assumed case of steel piano-wire support means 12—13 of diameter equal to 0.0088 inch. The frequency of resonance may be lowered by increasing the masses of the coils 14—27, or by decreasing the wire diameter, as will be understood.

In use as an analyzer or indicator, there is need only for connection to the terminals 32 or to the terminals 34; but, if desired, double thrusts may be obtained by connecting both coils for excitation by the same source. The torsional pendulum will, of course, oscillate at greatest amplitude at its natural resonance frequency so that the device may be used as an instrument to determine the relative amplitude of input signals possessing such component of frequency. Alternatively, the device may provide a highly accurate calibrating means for other devices, as where it is desired that a low-frequency response peak at the particular response-frequency of my device.

Alternatively, it may be desired to employ my device as a circuit-element transducer, such as a filter or oscillator. In such cases, the terminals 32 may be considered as input terminals and the terminals 34 as output terminals. Used as a filter, induced output at 34 will electrically reflect the amplitude of that component of the input signal which is characterized by the mechanical-resonance frequency of the device. As an oscillator, only a relatively small quantity of amplifier gain is necessary between terminals 34—32 in order to produce sustained oscillations, which may be electrically available at 34 as an oscillating source.

In Fig. 2, I show a slight modification of the device of Fig. 1 and, therefore, corresponding elements have been given the same reference numbers. In Fig. 2, however, the magnetic gaps are defined between radially-spaced arcuate members, as in the case of the magnet means 40, which is shown formed of a single suitably bent strip secured to the standard 18. The magnet means 40 may be of malleable permanent-magnet material, such as that known to the trade as "Cunife." Scale graduations may be applied to the outer leg 41 of the magnet 40, as shown. The outer magnet 43 may be of duplicate construction and secured to the standard 19. Coils 44—45 may be supported in coupled relation with the inner magnetic pole pieces 42—47, so that at least a part of each coil cuts flux lines in a gap; and the coil 45 may carry an indicator needle 48 extending over the outer surface of the pole piece 41. Operation of the device of Fig. 2 will essentially resemble that of device of Fig. 1.

My invention lends itself to relatively simplified design in applications in which there is no need to produce a display; that is, if the device is to be used purely as a circuit-element transducer, with input and output circuit connections. In Fig. 3, I show such an application, in which the rotating elements are again coils, and the fixed elements are again magnets. Virtually the entire assembly may be contained in a tube 50 of non-magnetic material, such as aluminum, extending between spaced supporting flanges or anchoring members 51—52. The torsional-suspension wire 53—53' may be securely anchored at both ends to the flanges 51—52. I have shown the coil assembly to comprise two axially spaced coils 54—55, wound on generally rectangular forms, and oriented to cut the magnetic lines set up by two permanent magnets 56—57 mounted externally of the tube 50; the flux density to which coils 54—55 are subjected may be increased by supporting soft-iron slugs 56'—57' fixedly within coils 54—55, as by non-magnetic pins 63 anchored to housing 50. The coils 54—55 are held to each other by rigid connecting means 58, connected to clamps 59 embracing the respective forms for coils 54—55. Similar clamps 60 embrace the other ends of the coils 54—55 for connection to the torsional-suspension means 53—53'. Flexible electrical leads to the upper coil 54 may be brought to terminals 61, which may represent input connections to the device; and electrical leads to the coil 55 may be flexibly tied to terminals 62 representing the output of the device. In order to minimize magnetic coupling effects between the separate halves of the device, the two separate magnetic circuits establish gaps (between 56—56'—56 on the one hand, and between 57—57'—57, on the other hand) that are preferably at right angles; clamps 58—59 are therefore devised to hold coils 54—55 at right angles to each other, for proper orientation in these gaps.

In operation, the device will respond to electrical excitations, applied at 61, by mechanically oscillating with an amplitude reflecting the input level of electrical energy at the mechanical resonance frequency of the device. The voltage induced in the output winding, and available at 62, will reflect this selective process free of electrical or magnetic coupling effects between input and output parts of the device. The input-output coupling is thus seen to be substantially only a mechanical coupling.

In Fig. 4, I illustrate a slight modification of Fig. 3 wherein the same moving coils 54—55 traverse magnetic lines established by fixed permanent magnets 65—66 positioned internally of the coils 54—55. The magnets 65—66 are shown supported on struts or pins 67—68 of non-magnetic material and extending diametrically on an axis preferably perpendicular to the permanently magnetized axes of the magnets 65—66. To facilitate assembly, I have mounted the strut and magnet 67—65 on a removable door or panel 69, covering an insertion-opening 70 in one side of the enclosure tube 71. When inserted and secured over the opening 70, the door 69 positions the projecting end of strut 67 for engagement with a locating hole in the opposite side of the housing 71, and I have applied a nut 72 over the projecting threaded end of strut 67 in order to hold the same securely in place. The strut 68 may be similarly supported on a door or panel 73 over an insertion opening 74, and interior panels, such as panel 73' secured to panel 73, may assure smoothness of inner-wall contour and accurate location of the magnetic means (66), as will be understood.

Unlike the device of Fig. 3, the tubular housing 71 of Fig. 4 is preferably of magnetic material, such as soft iron, so as to provide continuity of the magnetic circuits established by permanently magnetized elements 65—66. Magnet 65 may be permanently magnetized on a diameter at right angles to the supporting strut 67, so that the axially extending legs of coil 54 will traverse the maximum number of lines in the magnetic gaps established across this diameter to the soft-iron housing 71. The same relationship preferably obtains for the magnetization axis of element 66 except, of course, that this axis is preferably at right angles to that described for the magnet 65, in order to minimize magnetic coupling effects between the separate halves of the structure.

In Fig. 5, I show a further alternative arrangement in which coils 80—81 are held fixed in axially-spaced relation within a tube 82 of magnetic material, and again preferably with their respective legs in axial planes at right angles to one another. The moving elements 83—84 are rigidly connected to each other by non-magnetic means 85 and are torsionally suspended between wires 86—87. Each of the magnetic elements 83—84 may be a right cylinder, as described at 65—66 in Fig. 4, and each may be permanently magnetized on a diametral axis aligned with the respective coil legs. To facilitate assembly of the device, I have shown the coils 80—81 as being initially formed in rectangular shape and then later deformed, as by a simple bend or crease at 88—88' for the case of the coil 81, in order completely to clear the torsional-suspension means 86—87 and the connecting means 85. To hold the coil legs in place, I employ a slotted cardboard (or other non-magnetic flexible) tube lining the tube 82 and having appropriately oriented locating slots 89—89' for the legs of coil 81, and similar slots as at 90, for the legs of coil 80.

To assemble the device of Fig. 5, the coils and magnets 80—81 and 83—84, respectively, should be carefully inserted within the slotted cardboard tube, as by squeezing the cardboard until the coils are properly located. For protection, a thin paper wrapping may be sealed over the exposed ends of the slots 89—90, before the cardboard tube with the coils and magnets assembled therein is inserted in the tubular housing 82. Torsional suspension connections may then be made, as may also the electrical connections to leads 91 for the input and to leads 92 for the output.

It will be seen that I have described basically simple structures for achieving reliable low-frequency discrimination and response. My arrangements lend themselves to convenient display of the magnitude of the excitation component at the predominant response frequency; and, for purely circuit-element applications, my invention may be embodied in small and rugged structures without sacrifice of efficiency and at surprisingly low frequencies.

While I have described my invention in detail for the preferred forms shown, it will be understood that modifications may be made within the scope of the invention as defined in the claims which follow.

I claim:

1. An electromechanical filter, compring two separate electrical coils, each coil having a pair of opposed generally parallel legs, first rigid means fixedly holding said coils with respect to each other such that the essential plane of one pair of legs is substantially at a right angle with the essential plane of the other pair of legs, said coils being in spaced relation on an oscillation axis with each pair of legs symmetrically disposed about said axis, two polarized magnets, second rigid means fixedly holding said magnets with respect to each other such that a first plane of polarization is defined diametrically across said axis at the axial location of said legs of one pair and such that a second plane of polarization is defined diametrically across said axis at the axial location of said legs of the other pair, said planes of polarization being substantially at a right angle with respect to each other, and means torsionally resiliently connecting one of said rigid means to the other of said rigid means on said axis.

2. A filter according to claim 1, in which said last-defined means includes torsionally resilient connections between both corresponding axial ends of both said rigid means.

3. A filter according to claim 1, in which said first rigid means is fixed and said second rigid means is free for bodily torsional oscillation.

4. A filter according to claim 1, in which said second rigid means is fixed and said first rigid means is free for bodily torsional oscillation.

References Cited in the file of this patent

UNITED STATES PATENTS

| | | |
|---|---|---|
| 925,113 | Lloyd et al. | June 15, 1909 |
| 1,171,907 | Trent | Feb. 15, 1916 |
| 1,587,010 | Coley | June 1, 1926 |
| 2,112,560 | Davies | Mar. 29, 1938 |
| 2,358,910 | De Giers | Sept. 26, 1944 |
| 2,438,027 | Young | Mar. 16, 1948 |
| 2,457,685 | Klepp | Dec. 28, 1948 |
| 2,507,301 | Fulbright | May 9, 1950 |
| 2,560,257 | Sias | July 10, 1951 |
| 2,596,297 | Shotter | May 13, 1952 |
| 2,670,460 | Gilbert | Feb. 23, 1954 |